Aug. 23, 1932.  H. INOKUTY  1,873,127
APPARATUS FOR MEASURING CAPACITY OF A REFRIGERATING MACHINE

Filed Nov. 9, 1928

Inventor:
H. Inokuty
By Attorneys
Marks & Clerk

Patented Aug. 23, 1932

1,873,127

UNITED STATES PATENT OFFICE

HARUHISA INOKUTY, OF TOKYO, JAPAN

APPARATUS FOR MEASURING CAPACITY OF A REFRIGERATING MACHINE

Application filed November 9, 1928  Serial No. 318,304.

This invention relates to an apparatus for measuring capacity of a refrigerating machine making use of a direct volume meter for liquid in an enclosed passage, comprising a supplying and releasing device for compressed inert gas, a volume measuring tank connected to outlet of the condenser and arranged in an enclosed refrigerant circuit of the refrigerating machine, a liquid reservoir connected to the expansion valve, a valve and pipe connecting the lower part of the former to the latter, and another pipe connecting upper parts of the tank and the reservoir.

The object of the invention is to directly measure the volume of refrigerant circulating in an enclosed refrigeration circuit with almost no change of the flowing condition of the refrigerant before and after the apparatus with an extremely small loss of energy while without measuring the pressure differences and applying calculation, so that the capacity of a refrigerating machine can be measured with great accuracy and remarkable ease.

Figure 1:
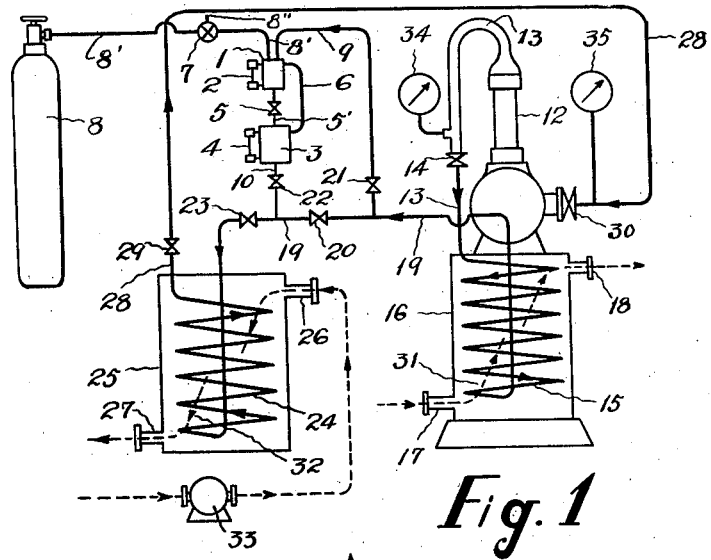
Figure 2:
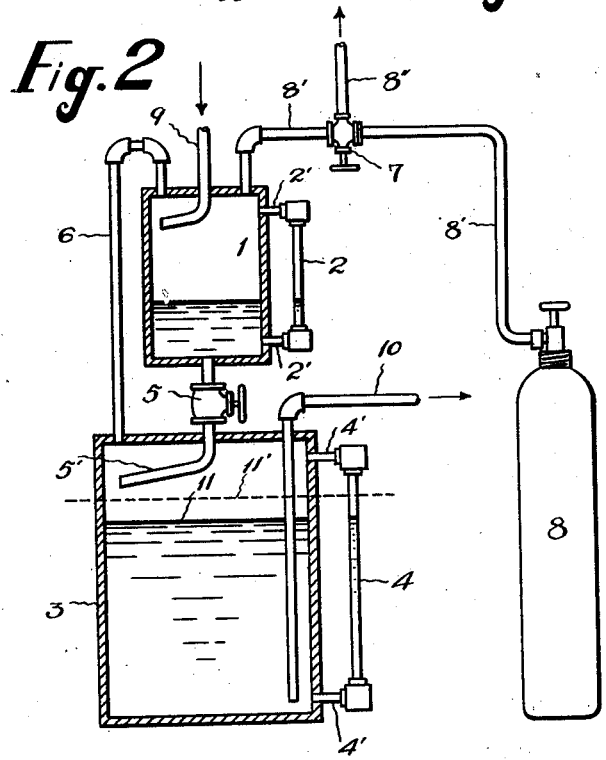

In the accompanying drawing, Fig. 1 represents in diagrammatic view, how the new apparatus for measuring the capacity of a refrigerating machine embodying my invention is arranged in the refrigerant circuit of a vapour compression refrigerating machine. Fig. 2 represents a vertical longitudinal section, excepting an inert gas reservoir, through the new apparatus for measuring the capacity of a refrigerating machine. Similar characters of reference indicate corresponding parts throughout the figures and referring now to the same:

1 is a calibrated measuring tank for the liquefied refrigerant, connected at its top to the condenser 16 of a vapour compressor 12, by the pipe 9 and 19, between which is interposed a valve 21 in order to cut off the apparatus for measuring the capacity of refrigeration out of action, and to short-circuit the refrigerant directly from the condenser 16 to the expansion valve 23, situated just in front of the evaporator 25, by the pipe 19 and through a valve 20. The end of the pipe 9 projects a little into the upper part of the tank 1 and is bent towards the wall of the same leaving a narrow space between them as shown in Figure 2, so as to make the liquefied refrigerant coming from the condenser 16 through the pipe 9 flow gently down along the wall of the tank 1. The tank 1 is connected by a pipe 5′ and a cock 5 of a fairly large diameter to another tank or receptacle 3 situated directly below the tank 1.

The end of the pipe 5′ is also projected into the upper part of the tank 3, and is also bent toward the wall of the same leaving a narrow space as shown in Fig. 2, for the same purpose of letting the liquefied refrigerant to flow down gently along the wall of the tank 3. Each tank 1 and 3 is fitted at one side with a vertical glass tube 2 and 4 respectively, having tubular connections 2′, 2′ and 4′, 4′ respectively, with each tank 1 and 3. There is another pipe 6 of a smaller diameter in comparison with the pipes 19, 9, and 5′, connecting the upper parts of the tanks 1 and 3. The function of this pipe 6 is to equalize the pressures in the tanks 1 and 3 as will, however, be explained more fully below. 7 is a three-way valve fitted in a pipe 8′, one end of which is opening into the upper part of the tank 1 and the other end is connected to a reservoir 8 containing some inert gas under a proper high pressure, or to the source of supply of some inert gas under pressure which is not shown. The remaining one way of the three-way valve 7 is open to free atmosphere by a short pipe 8″. The function of the valve 7, the pipes 8′, 8″, and the reservoir 8, is to introduce or to expel a proper amount of some inert gas into or out of the tanks 1 and 3 of the device as will, however, be explained more fully below. A pipe 10 with a valve 22 leads out of the bottom of the tank 3, and connects the tank 3 to the expansion valve 23. The expansion valve 23 is also connected directly to the condenser 16 through the pipe 19 and the valve 20. With these arrangements the apparatus for measuring the capacity of the refrigerating machine shown in Fig. 1 may be entirely cut out of the circuit of the refrigerant by closing valves 21 and 22, when it is not necessary to measure the capacity; and the liquefied refrigerant is fed directly from the condenser 16 to the expansion valve 23 through the pipe 19 and by opening the valve 20. The liquefied refrigerant expands through the expansion valve 23 into the coil 24 placed in the refrigerator, or evaporator 25, where any medium, such as brine, water, or air, is circulated by a pump 33 as shown in broken lines and arrow-head 32 in Fig. 1, entering in at 26 and leaving out at 27, the evaporator 25; the direction of the circulation of the medium to be refrigerated may, however, be reversed if it is desirable. The refrigerant absorbing heat and having cooled the medium will evaporate and change into vapour, and will be sucked by the action of the compressor 12, the suction side of which is connected to the outlet of the coil 24 from the refrigerator 25 by a pipe 28 and valves 29 and 30 as shown in Fig. 1. A pressure gauge 35 will indicate the pressure of the refrigerant in the evaporator 25. The gaseous refrigerant sucked by the compressor 12 is compressed to a higher pressure and temperature, and is delivered out into a delivery pipe 13. A pressure gauge 34 is attached to this part of the delivery pipe 13, and will indicate the delivery pressure which should be suitable for the temperature of cooling water circulating in the condenser 16. The gaseous refrigerant at a higher temperature and pressure is led through a valve 14 into the coil 15 situated in the body of the condenser 16, in which circulates some cooling medium, generally cooling water, entering the condenser at 17 and leaving the same at 18, and passes it as shown in broken lines and arrow-head 31 in Fig. 1; the circulating device of the cooling water being not shown. The refrigerant is cooled and re-liquefied as in the usual way in the condenser 16, and is sent out through the pipe 19 to the valve 21, or 20, according to whether it is necessary or not necessary to measure the refrigerating capacity. The flow of the refrigerant is now just the same as fully explained from the beginning of this explanation.

When the meter is put into the circuit of refrigerant as shown in Fig. 1, the valve 5 is at first left full open. Then we can see no level of the liquefied refrigerant in the glass tubes or gauges 2 and 4. Because it is not probable to assume a priori that the refrigerating circuit will contain some inert gas. In an actual circuit of a vapor compression refrigerating machine, however, we may have very frequently some inert gas left in the circuit due to the imperfection of evacuation before the first charging of the refrigerant into the circuit, or due to the impurities in the charge of the refrigerant. It is a well known fact that the non-condensable gas must be eliminated from the circuit in order to improve the action of the refrigerating machine. Especially in a small household refrigerating machine with the automatic temperature controlling device developed recently, it is necessary to fill the circuit with very pure refrigerant containing practically no foreign non-condensable gas in the circuit. And it is well known that the proper pressure of the refrigerant indicated by the gauge 34 in the delivery side of the circuit comprising 13, 14, 15, 19, 20, 21, 9, 1, 5, 3, 6, 10, and 22 in Fig. 1, must be a little higher than the saturation pressure corresponding to the temperature at and to which the cooling water is capable of condensing and cooling the refrigerant, in order to make the action of the condensation and liquefaction of the refrigerant positively certain. The liquefied refrigerant coming out from the condenser 16 and flowing into the tanks 1 and 3 by the pipes 19, 9, and 5', is generally in a state of undercooling, or with a pressure higher than the saturation pressure of its temperature.

It is evident from what has been explained above that the vapour pressure of the refrigerant is smaller than the condenser pressure prevailing in the tanks 1 and 3. And it is, therefore, not possible to have the vapour of the refrigerent evolving from the liquid in the tanks 1 and 3, and we will have neither vapour space nor liquid level in the tanks. Hereupon we have the necessity of introducing a proper amount of inert gas supplementing the deficiency in the vapour pressure of the undercooled liquid to the amount equal to the pressure in the condenser.

The amount of the inert gas to be introduced must be such that to make the total pressure of the saturated vapour and the inert gas, being the sum of the partial pressure of each constituent vapour and gas, equal to the pressure of the delivery side of the circuit as indicated by the pressure gauge 34.

The inert gas is kept stored in the tank 8 under pressure, or may be obtained from some source which is not shown. The inert gas is led through the pipe 8' into the tanks 1 and 3, and pushes down the liquid in the tanks, expelling all the liquid out of the tank 1 into the tank 3. As the diameters of the pipe 5' and the valve 5 are made fairly large, the liquid will not accumulate in the tank 1 flowing down along the wall of the tank 1 into the tank 3 through the large pipe 5' and valve 5. The level of the liquefied refrigerant in the tank 3 will remain unchanged which will be seen in the glass tube 4 as indicated 11' in Fig. 2, if a proper amount of the inert gas is introduced and the state of the running of the refrigerating machine is steady. Now the clear space over the liquid in the tanks 1 and 3 is occupied by a mixture of the saturated vapor of the refrigerant at the temperature of undercooling and a proper amount of inert gas introduced. The three way valve 7, the pipe 8', and the pipe 8" serve to regulate the quantity of the inert gas, releasing it by 8" or charging it by 8' from the reservoir 8. There is no danger of the inert gas being introduced into the other part of the circuit, because the gas is always held in the measuring apparatus itself seal by liquefied refrigerant between the valves 21 and 22. To measure the capacity of the refrigerating machine, simply close the valve 5; then the liquefied refrigerant accumulates in the tank 1, as shown in Fig. 2 expelling the mixture of the gas and the vapor in the tank 1 through the pipe of a small diameter 6 down to the tank 3. Upon the liquid surface in the tank 3, therefore, there is exerted always the same total pressure of the mixture of the gas and vapor equal to the condenser pressure. Thus a definite quantity of liquid refrigerant, whether the valve 5 is closed or opened, will always flow to the expansion valve 23 through the pipe 10 and the valve 22, and the liquid level in tank 3 will lower from 11' to 11 as shown in Fig. 2, for the difference of the pressure due to the change of the liquid level in the tank 3 is negligibly small compared with a large drop of pressure existing at the expansion valve 23 of ordinary refrigerating machines. Then the measurement of the flow directly by volume is effected simply by measuring the time of rise of the liquid level in the calibrated tank 1, which will be clearly indicated in the glass tube 2, by means of a stop watch or chronometer. After the measurement we open the valve 5, then the liquid in the tank 1 drops down into the tank 3 through the pipe 5' and valve 5 of a fairly large diameter in an instant, and the original state of liquid level 11' is at once regained. Thus we can repeat the measurement of volume of flow of the liquefied refrigerant anew.

Now let the circulating amount of the liquefied refrigerant measured by the apparatus be V cubic meters per hour, then the capacity of the refrigerating machine R in kilogramme-calories per hour becomes $$R = Vwx(i_1 - i_2)$$

where $w$ is the density of the liquefied refrigerant in kilogrammes per cubic meter and has a known value from the temperature and pressure of it, $i_1$ is the total heat of the refrigerant at the outlet of the evaporator in kilogramme-calories per kilogramme, and $i_2$ is that at the outlet of the condenser or inlet of the evaporator in kilogramme-calories per kilogramme and both have definite values according to the pressure, temperature and dryness.

Any refrigerant having a large drop of pressure at the expansion valves, such as carbon dioxide, ammonia, methyl chloride, or sulphur dioxide, may be used.

Briefly, this invention enables to measure the amount of liquefied refrigerant flowing in an enclosed refrigerant passage by a direct measurement of its volume, and not only makes any constant previously determined by measurement unnecessary, as in known liquid meter or liquid flow meter of the indirect type such as Venturi meter, orifice meter, pitotmeter, weir, etc., which determine the flowing amount of liquid by such an indirect method as to require calculation using a constant determined by experiment, but also can be used for determining coefficients for these indirect liquid meters, so that it is an industrial invention capable to measure the capacity of a refrigerating machine with great accuracy and remarkable ease.

I claim as my invention:

An apparatus for measuring capacity of a refrigerating machine, placed in the refrigerant circuit of a refrigerating machine between the condenser and the expansion valve, including a direct volume meter for the liquefied refrigerant, comprising a volume measuring tank connected to the outlet of said condenser, a reservoir connected to the inlet of said expansion valve, a source of inert gas under pressure, means connecting said source to said measuring tank for supplying said inert gas to said measuring tank and reservoir at the desired pressure, a valve and pipe connecting the lower part of said measuring tank to said reservoir, and another pipe connecting upper parts of said tank and reservoir, substantially as described.

In testimony whereof I affix my signature.

HARUHISA INOKUTY.